United States Patent [19]
Geist, Jr.

[11] Patent Number: 5,491,808
[45] Date of Patent: Feb. 13, 1996

[54] METHOD FOR TRACKING MEMORY ALLOCATION IN NETWORK FILE SERVER

[75] Inventor: James F. Geist, Jr., Redmond, Wash.

[73] Assignee: Conner Peripherals, Inc., San Jose, Calif.

[21] Appl. No.: 954,129

[22] Filed: Sep. 30, 1992

[51] Int. Cl.⁶ .............................. G06F 12/00; G06F 9/32
[52] U.S. Cl. .................... 395/427; 364/DIG. 1; 364/282.2; 364/284.2; 364/280.8; 395/600; 395/410; 395/280; 395/728
[58] Field of Search .................................. 395/600, 400, 395/425, 725, 325; 364/DIG. 1

[56] References Cited

U.S. PATENT DOCUMENTS

| | | | |
|---|---|---|---|
| 4,817,080 | 3/1989 | Soha | 370/17 |
| 4,891,639 | 1/1992 | Nakamura | 340/825 |
| 5,133,065 | 7/1992 | Cheffetz et al. | 395/575 |
| 5,220,655 | 6/1993 | Tsutsui | 395/325 |
| 5,226,120 | 7/1993 | Brown et al. | 395/200 |
| 5,255,183 | 10/1993 | Katz | 364/406 |
| 5,257,381 | 10/1993 | Cook | 395/700 |
| 5,315,580 | 5/1994 | Phaal | 370/13 |
| 5,327,489 | 7/1994 | Anderson et al. | 379/207 |
| 5,430,709 | 7/1995 | Galloway | 370/17 |

OTHER PUBLICATIONS

Day & Neff, *Troubleshooting NetWare for the 386*, Ch. 21, pp. 559–577 (M&T Books, 1991).
McCann, *NetWare Programmer's Guide*, pp. 282–284 (M&T Books, 1990).

Primary Examiner—Thomas G. Black
Assistant Examiner—Jean R. Homere
Attorney, Agent, or Firm—Fliesler, Dubb, Meyer & Lovejoy

[57] ABSTRACT

A method for dynamically tracking memory resource allocations/deallocations of a program resident in the memory of a network file server is disclosed wherein calls to system memory allocation functions are intercepted and diverted to memory resident tracker routines, interposed between the caller and the called functions to monitor returns from the called functions. Public symbol lists of application program interfaces are scanned for functions to be tracked, and function entry points are taken over by replacing initial instructions of the system functions with jumps to the tracker routines. The tracker routines then call the remainder of the system functions and record the reply before passing control back to the original caller program. Information on allocated blocks is written to ABLK blocks taken from an ABLK free block pool allocated at tracker startup. Subsequent deallocations of the allocated blocks release the same ABLK blocks back to the ABLK free pool. Information on "NULL" pointer and similar returns indicating allocation/deallocation errors is written to MSG queue blocks taken from a MSG free block pool allocated at tracker startup. Log file generator threads are activated to list the filled ABLK and MSG blocks when signalled. Cleanup routines restore the replaced code and deallocate all ABLK and MSG memory blocks when the tracker exits.

10 Claims, 4 Drawing Sheets

WRITEOUTPUT THREAD ()

METHOD FOR TRACKING MEMORY ALLOCATION IN NETWORK FILE SERVER

This invention relates to a method for tracking memory allocation and deallocation for a server memory resident program in a computer network file server, such as a file server working under a NetWare 386™ or the like network operating system.

BACKGROUND OF THE INVENTION

A local area network (LAN) connects personal computers (PCs) together to enable the sharing of hardware and software among multiple users. The hardware components of a network comprise a plurality of individual user PC workstations, at least one server, network communications boards associated with each workstation and server, and electrical cables interconnecting the boards.

A server is a PC or other computer whose resources are made commonly available to the various network users. The most common type of server is a "file server," which typically includes a large capacity hard disk whose files are made accessible to all users. The network enables files to be read from and stored to the shared server disk, the same as if users were using separate hard disks located at each workstation. The workstation PCs execute files in the normal manner, except that the files are retrieved from and returned to the server hard disk. Both the workstations and the server have CPUs (central processing units) to perform the processing tasks of executing programs and controlling hardware operations.

High speed communications (1 million to 16 million bits per second) are made possible by installation of "network adapter" or "network interface" boards in the workstation and server PCs, and interconnecting the boards by cables. Files are transferred by the server's CPU to the server's board where they are translated into one or more "data packets" of, typically, 500 to 2,000 bytes each, transmitted via the cable to the requesting user's workstation board, then retranslated back into usable files to be acted upon by the workstation's CPU. Routing is under control of destination and source addressing information included with each packet according to a scheme of unique address numbers preassigned to each board.

A network operating system (OS) is the software that provides the set of instructions for operating the server hardware and for making the communications between workstations and server possible. This software corresponds to the disk operating system (PC DOS, OS/2, etc.) used by PCs operating independently in a non-networking manner. The network operating system controls the operation of the file server CPU, and cooperates with the workstation disk operating system to coordinate the use of network shared resources by managing disk access, file storage and memory utilization. Drive letters are assigned to the file server disk volumes, so that they can be accessed and manipulated with the workstation PC DOS or other disk operating system commands, the same as if they were part of the disk hardware on the individual workstation PCs.

NetWare 386™ is a network operating system written by Novell, Inc. It runs on 80386, 80486 and later CPUs, and permits up to 250 users to be accommodated by a single server. NetWare 386™ provides the network management functions needed for sharing files between a file server and multiple user PCs; and also provides security and sharing services for those files. NetWare 386™ also provides a capability for running in-house and third party developed application programs, such as database servers and communications gateways, on the server itself. These applications, known as NLMs (NetWare™ Loaded Modules), coexist with the network operating system in the server processor, in order to gain speed of access or special services not available elsewhere on the network.

A CPU does not normally read information directly from a hard disk but moves it first from hard disk to RAM (random-access memory), then reads it from RAM. Likewise, a CPU does not write information directly to hard disk but moves it first to RAM, then to hard disk. Thus, in order to enable multiple users to share the same disk resource efficiently, the server's RAM memory must likewise be used as a buffer between the individual workstation CPUs and the shared hard drive. With NetWare 386™ for instant access by the server CPU, the shared disk's directory of files and file allocation table (FAT) are stored in server memory by means of directory caching. NetWare 386™ also speeds up file locating by using directory hashing and file caching. The former provides for directory searching by subsets instead of file by file; the latter makes currently used disk-resident files more accessible by loading them into server memory on an automatic prerequest buffering basis.

NetWare 386™ allows the execution of both single-purpose commands (similar to single purpose DOS commands that perform one function, then stop running) and multipurpose NLMs (similar to DOS-based TSRs like MODE, FASTOPEN and GRAPHICS that terminate and stay resident in memory). Both the single-purpose commands and NLMs are executed from the server keyboard, run on the server CPU, and display output on the server display. Multiple programs are displayed on multiple windows or "screens." NLMs can be drivers that provide interfacing to particular hardware devices; utilities that enable the server to be configured, controlled or monitored; or name spaces that enable the sharing and manipulation of non-DOS files. Some NLMs come as part of the network operating system. The INSTALL NLM, for example, comes with NetWare 386™ and is used to install and configure the server. The MONITOR NLM also comes with NetWare 386™ and provides current server utilization statistics and information regarding the status of user connections. There is, however, a growing number of in-house and third party NLMs that do not come with the operating system, but must nevertheless be made compatible with it.

NLMs are advantageous over workstation run programs because the NLMs take advantage of the server resident benefits to perform tasks much more efficiently using the full capabilities of the server CPU, which is typically a more powerful processor than the CPU at a particular workstation. One type of NLM that is becoming popular is a database server or "engine," which responds to workstation inquiries for shared disk data, by performing database processing and file retrieval functions at the server level, thereby reducing network communications requirements.

Server execution of an NLM begins with a LOAD command, which loads the program into server RAM memory and continues to run it until it is unloaded by an UNLOAD command or automatic unloading procedure internal to the NLM program itself. For example, the INSTALL NLM module unloads itself when the EXIT option is selected from the main menu.

The MONITOR NLM can be used to identify the currently loaded NLMs and their memory usage (module's memory size and amount of server short-term memory in use at a particular time). When a server is booted, all unused memory is made available for caching. As memory is needed for other tasks, it is taken from the cache buffer pool. The MONITOR NLM identifies the number of memory buffers available for directory caching, file caching, and to receive incoming packets from workstations. The MONITOR NLM does not, however, identify individual memory allocations, deallocations and reallocations as they occur in the running of a particular NLM.

The network operating system, its data, and all currently loaded NLMs and their data reside in the file server's RAM memory. The dynamic allocation and reclamation of this memory is managed by the network operating system. For efficiency, the network operating system subdivides memory into several pools according to intended use. There are short-term, semipermanent, and permanent memory pools. The network operating system provides a set of functions which any NLM may call to request services. A subset of these calls deals with managing memory. The set of calls NetWare 386™ provides is called an Application Program Interface (API). The memory management functions that may be called are collectively referred to as the allocation API.

The pools of memory maintained by NetWare 386™ are referred to as "kernel memory," "permanent memory," "alloc memory" and "cache memory." These are described in Chapter 1 of Day & Neff, *Troubleshooting NetWare for the 386*, 1991, M&T Books, San Mateo, Calif.

"Kernel memory" is an area of memory in protected mode (above the 1MB address) into which is loaded the "kernel," or core code that performs the fundamental processing chores (including the memory manager component) of the network operating system. Kernel memory is static memory that remains dedicated to the kernel, so unavailable for reassignment whenever NetWare 386™ is running.

"Permanent memory" refers to memory dedicated to core data structures, like network communications buffers, and directory information, that remain in place for the duration of NetWare's execution Permanent memory is "semi-dynamic," in that it has a static base level configuration, which is augmented dynamically by allocations of "semi-permanent" memory from other pools when expansion is necessary. Once allocated, however, semi-permanent memory remains dedicated to the data structure for which it was allocated, and is not returned for reallocation elsewhere.

"Alloc memory" refers to memory allocated for short-term purposes, including use by NLMs. Alloc memory is maintained as a set of available memory addresses in a chain, or linked list, which is cycled through to fulfill NLM allocation requests. Using a linked list enables NetWare 386™ to initialize its alloc memory only once, but retain the ability to use the same chunk of memory repeatedly to fulfill allocation requests. Every time an NLM requires memory, NetWare 386™ delivers that memory to the NLM from the alloc memory pool. When the NLM is finished with the memory, it returns it back to the alloc memory pool. In this way, NetWare 386™ can "recycle" the memory by placing it back on the linked list of available alloc memory. If memory requirements of NLMs increase beyond the capacity of the initial alloc memory pool, more alloc memory can be appropriated from the cache memory pool; however, once taken, that memory is not returned to cache. To prevent cache depletion, therefore, a maximum size of the alloc memory pool is set, within predefined limits (viz. 50KB to 16MB, with a default maximum size of 2MB).

All memory not being used as kernel, permanent, semi-permanent, or alloc memory is made available for file caching. "Cache memory" is the most dynamic memory pool, and individual buffers, which act as temporary file data storage areas, are being continually recycled. File cache memory is further divided into "non-moveable" and "moveable" cache memory. Nonmoveable cache memory is similar to alloc memory in that it is suitable for short-term usage, and is maintained in a linked list, from which it is allocated for use by NLMs or the like, and to which it is reclaimed. Non-moveable cache memory is, however, available for use as file cache buffers after being freed up by an NLM. Moveable cache memory is similar to unmovable cache memory, except that it can be relocated to different physical memory addresses in order to maintain an efficient mass or "heap" of total memory available for use by the operating system (i.e. to eliminate fragmentation). The "overhead" required to maintain moveable memory is not justified for short-term memory assignments. In a file server environment, NetWare 386™ uses all memory not required by the kernel or NLMs for file system caching.

The four main components of the NetWare 386™ operating system are the NetWare™ Loader, the kernel (already described above), the NLM environment, and the application services. See, Day & Neff, Ch. 1, supra. The NetWare™ Loader initializes the server's hardware and loads the kernel. It thereafter acts as a run-time linker, enabling dynamic loading (and unloading) of NLMs, permitting them access to the kernel. The linking process makes the addresses of executable routines of the NLM available to the operating system and, vice versa, makes certain kernel and other NLM function addresses available to the NLM. As already mentioned, the kernel is the heart of the operating system code and includes routines that provide its file system, scheduler, memory management and networking services. The NLM environment encompasses the loader and kernel and provides scheduling, memory management, and all resources needed to run NLMs. The application services are basic networking functions available both to NLMs running on the same server and to remote clients running on the same network.

The NLM environment includes a "C" library or CLIB component which acts as an interface between low-level routines of the operating system kernel and NLMs written in the "C" programming language. The CLIB is a special, low-level NLM that uses private labels and kernel "hooks" not made available for use by -third-party NLM developers. CLIB comprises a collection of function calls made "public" for use by other NLMs to gain access to the kernel of the operating system. This not only protects the kernel, but also insulates developers from version changes within the kernel. NLM developers are, thus, encouraged to write their C language NLMs using CLIB function calls, rather than addressing the kernel directly. Other programming language interfaces may be created using Assembly language interface documentation.

An NLM can call upon the NetWare 386™ allocation API to perform the following memory related functions: request for allocation of a block of memory from NetWare 386™ (alloc); return of a block of allocated memory back to NetWare 386™ (free); and request for a change in the size of an allocated block of memory (realloc). These functions are available to work with memory from the variety of memory pools described above. The value returned to the caller from execution of the alloc and realloc functions is called a pointer because it points to an address of a block of memory made available.

Errors can arise when working with memory allocation. If no memory is available when requested, a special pointer called the NULL pointer is returned to indicate the no memory available condition. It is an error for an NLM to free a pointer that never came from alloc or realloc, or to use the free function for one pool to free memory allocated from another pool. Finally, the NLM must be sure to free all memory it has allocated when it terminates. If the last requirement is not met, the NLM may interfere with normal functioning of the network operating system and will not be able to receive certification from Novell.

NetWare 386™ does not provide a way to track memory allocation errors dynamically while developing new NLM applications to run under NetWare 386™.

SUMMARY OF THE INVENTION

It is an object of the present invention to provide a method for dynamically tracking network operating system allocations, releases and reallocations of server RAM memory in the running of a server resident program in a computer network.

In accordance with the invention, a method of dynamically tracking the allocation and deallocation of memory within the file server is provided, which generates reports on what memory allocations remain unfreed and what, if any, unusual events have occurred in the memory management process. The method intercepts memory allocation calls made by a server loadable program to the network operating system and logs the memory allocations and releases resulting from those calls. Events of allocations without release, or releases without allocation are noted for attention by the programmer.

In its preferred form, discussed in greater detail below, the method of tracking memory allocation/deallocation is implemented by means of an NLM which watches the occurrence of memory related calls (viz. APIs) by both the network operating system (viz. NetWare 386™) and other server resident NLMs. The allocation tracking NLM generates a list of the sequence of what memory is allocated, in what order, by what NLM, and of occurrences of allocation-related errors, such as freeing a never allocated memory block.

The tracker works by taking over the entry points of the system memory allocation routines from both the NetWare™ kernel and the CLIB. The first few bytes of each routine are overwritten with a jump to an assembly language routine (called a "thunk" after a Microsoft Windows™ object of similar nature). The thunk fixes up registers and calls the rest of the routine and then calls the stub for the routine, which performs logging operations. To avoid multiple logging of the same block of memory (i.e. when "malloc" calls "Alloc," etc.) the thunks are arranged to make them mutually exclusive, so that a memory allocation will only be trapped at the highest level.

The allocation tracker maintains two memory pools which it allocates at startup time (for reentrance and speed considerations). One, the allocation block or "ABLK" pool, holds one element per outstanding allocation. The other, the message block or "MSG" pool, holds one element per outstanding exception message. These are used for reporting events like freeing memory that was never allocated. Tracking begins as soon as the tracker NLM is loaded. The tracker maintains a screen on the operating system; and, whenever a key is hit, it writes the log file. The tracker can be set to track all calls to allocation routines, or just those made by a particular other NLM to be monitored. For tracking a particular other NLM, the user sets the tracker to "spawn" (viz. execute) the other NLM and logs only those calls made by that NLM. If no NLM is specified to be spawned, the tracker will remain until unloaded. If an NLM is spawned, the tracker will generate a report and exit when the spawned NLM exits. Because of restrictions on file I/O in report routines, the log file generation code is run as a separate thread. A log file is generated by setting up and calling a local write output semaphore.

The method of the invention provides an aid to the developer of server resident programs in finding memory allocation problems that lead to erratic program behavior or unreleased resources. Using the method of the invention, the developer of a NetWare 386™ NLM can run an NLM application and see exactly where unfreed memory was originally allocated, and where bogus calls to allocation APIs were made.

BRIEF DESCRIPTION OF THE DRAWINGS

Embodiments of the invention have been chosen for purposes of illustration, and are described below with reference to the accompanying drawings, wherein.

DETAILED DESCRIPTION OF PREFERRED EMBODIMENTS

Figure 1:
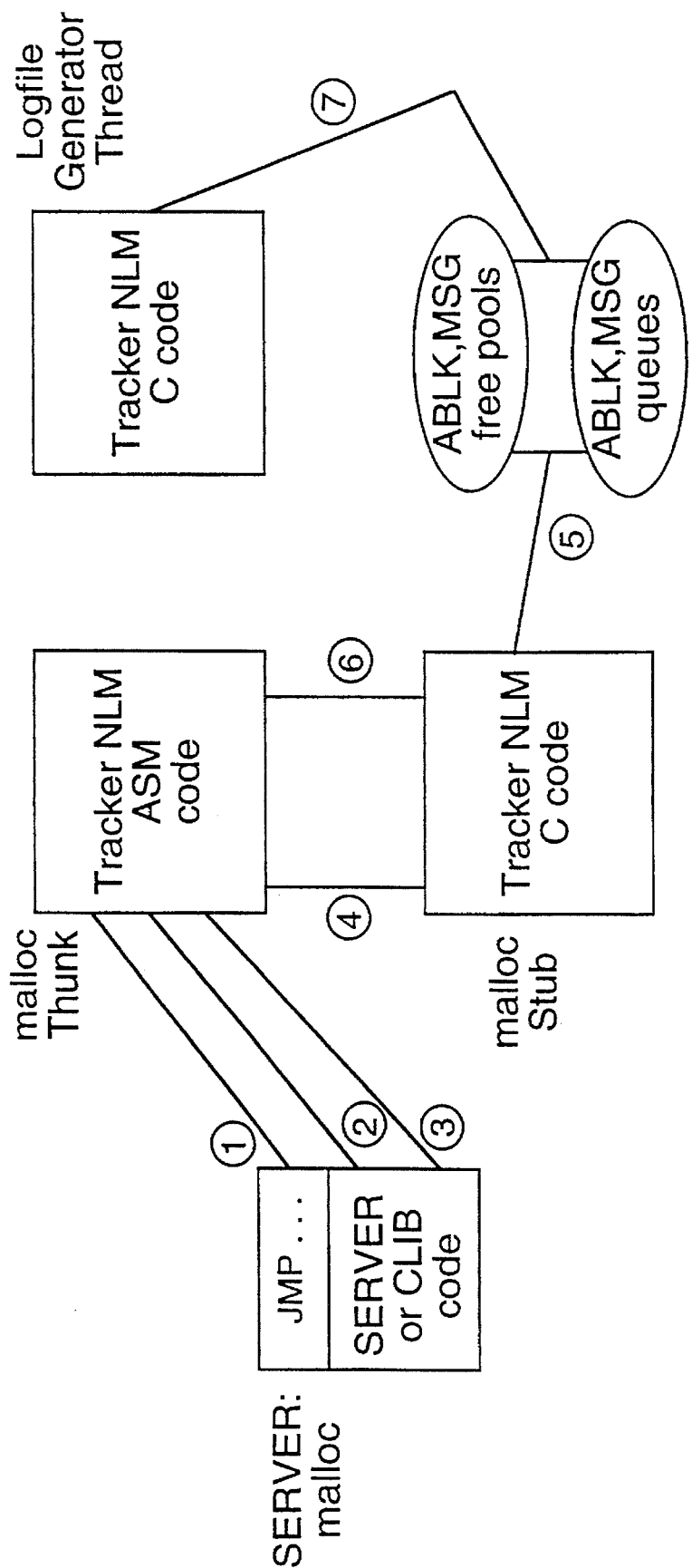
FIG. 1 is an overall functional block diagram of an allocation trapping and logging operation of an embodiment of the method of the invention.

An exemplary method of the invention is implemented in the form of a memory allocation tracker that resides in the RAM memory associated with a file server CPU running a NetWare 386™ network operating system and utilized for the sharing of files of a server hard disk by a plurality of workstation CPUs linked by electrical cable to the server through network interface boards.

The allocation tracker may comprise a utility NLM program for tracking memory allocations and frees in the NetWare 386™ file server environment, to assist in the development of other NLMs by informing the developer of invalid or unusual calls to memory manager serves and of memory resources allocated but not released before the application program terminates or is unloaded. The tracker is intended to be unobtrusive (i.e., user transparent), so that it can be run behind the NLM being developed, through testing cycles as well as during integration testing.

Unlike older programming languages, such as FORTRAN which require declaration of memory usage requirements at the time of compilation, the "C" programming language allows blocks of memory to be requested and released dynamically, while a program is running. For C language NLMs running in a file server, the memory management capability comes in the form of a library of "memory allocation" routines provided by the network operating system, as discussed above. Typical among these are allocation routines made "public" (callable by third party programs) under the names "malloc," "calloc," "realloc," "strdup" and "free," or variations thereof The "malloc" function is called to allocate a desired number of bytes of memory from a memory "heap" for use by the calling program. "Malloc" returns the address of the allocated block of memory as a pointer to an, e.g., "void" type data item "Calloc". operates similarly and is utilized to allocate a block of memory needed for an array of elements, each of a given size, and to initialize all allocated bytes to zero.

"Realloc" is used to enlarge or shrink the size of a previously allocated memory block, with or without moving the block in the heap, so may return the same block address or a different one. "Strdup" is used to allocate memory and copy a given string into the allocated space. The "free" routine is used to release a block of memory previously allocated by a call to "malloc," "alloc," "realloc" or "strdup."Other memory allocation routines available on external or internal public lists within NetWare 386™ include "Alloc," "Alloc-SemiPermMemory," "AllocNonMovableCacheMemory," and their corresponding memory freeing routines, "Free," "FreeSemiPermMemory," and "FreeNonMovable-CacheMemory." The public lists provide the addresses for the entry points to these system routines.

In accordance with the invention, the tracker NLM provides server resident means for use by C language NLM developers to hook all known memory management entry points in both the kernel and the C language programming library, or CLIB. The tracker functions to intercept memory allocation calls made by the server loadable program to the network operating system. For the described NetWare 386™ environment, this is done by taking over the entry points of the memory allocation routines from the NetWare™ kernel and CLIB components, so that calls to and returns from those routines are made by way of the tracker. In this way, the tracker NLM can identify whenever a memory allocation, deallocation or reallocation call occurs, and can make a record of that call and of its return. This enables the tracker to log all outstanding memory allocations.

The tracker works by taking over operating system calls at the lowest possible level and value-checking all arguments and return values. Two lists are maintained by the tracker: an allocated block (ABLK) list containing one element per current allocated block of memory, and a message (MSG) list containing one element per questionable event that has happened since the last report was generated. When the tracker NLM starts up, it allocates free memory pools for both the ABLK and MSG lists. This is done by preassignment to simplify reentrance considerations and to improve speed. If the allocations were successful, the tracker NLM takes over the memory related operating system calls. This is done by finding the actual memory management functions of each other server resident NLM by examining their global symbol lists and replacing the first few instructions (called the "prefix") of each function with an instruction to cause a jump (JMP) to a special assembly routine, or "thunk." "Thunking" is a method of replacing the first few bytes of a system routine with a jump instruction that transfer control to a small stub function located elsewhere, called a "thunk." Once control is gained, the thunk routine may perform any action it wishes in addition to calling the remainder (part following the prefix) of the original system routine. In the case of the memory allocation tracking method of the invention, the thunks call the remainders of the system memory allocation functions, then log the results to a file. One thunk is associated with each memory management function being tracked. The tracker then starts a "thread" (sequence of programming steps) to handle generation of the log file and sits in a loop waiting for a file update prompt. The thunks are small assembly code subprograms which handle the mechanics of calling both the original allocation routine and a reporting routine.

The log file generator is preferably implemented by means of a thread, which is separate from the thunks, to avoid problems caused by continuous execution of file input/output operations. The thread is executed to update the log file whenever either a keystroke is hit while the server is in the tracker's screen, or an NLM being monitored is unloaded. The log generator traverses both the ABLK and MSG lists, to provide useful information about the allocated memory. As much symbolic information as possible is given, including the current CPU context (i.e., which NLM was running), which NLM owned the called code, and what the nearest public (i.e., shared network operating system) symbol was.

Example function call

FIG. 1 details the sequence of operations by which the described memory allocation tracker tracks a function call. In the given example, the tracked call is one made by another server resident NLM to the "malloc" routine using the CLIB interface.

As indicated at 1, the first instructions in SERVER:malloc have been replaced by a jump to the malloc thunk in the NLM tracker. The malloc thunk sets up registers, and executes a call, at 2, to the original malloc code following the inserted jump instructions. The replaced instructions are reproduced or simulated, if needed, and executed in the thunk. The SERVER:malloc then runs to completion as originally scheduled and returns, at 3, to the thunk. The thunk then sets up parameters and, at 4, calls the reporting stub (end sequence of instructions) for malloc. The stub determines what characteristics of the event to record and, at 5, removes blocks from the ABLK and/or MSG free pools, fills them out, and places them in the appropriate list. At 6, the reporting function finishes and returns to the thunk, which then returns to the original caller at the place where the call was first made. At some later time, in response to detection of a tracker screen key or unload flag, the log file generator thread is executed, to perform step 7 which reports on the contents of the ABLK and MSG list queues.

To start the tracker NLM, it must be first copied into the SYS:SYSTEM directory of the file server. This is done with the LOAD command. For a tracker NLM called ALLOC-TRK.NLM, the command LOAD ALLOCTRK [options] is entered at the network operating system command prompt.

The tracker option command line parameters, may be as follows:

| Switch | Default | Meaning |
| --- | --- | --- |
| -a | 512 | Number of ABLK elements |
| -m | 256 | Number of MSG elements |
| -s | None | Name of NLM to spawn |

The tracker is set to write a log file to a file (e.g. SYS:ALLOC.LOG) on the server it runs in. The log file name can either be set by default or by user selection, and can be configured to either replace itself each time the tracker is run, or with an option to permit new information to be appended.

The tracker NLM may be configured so that, at any time the tracker is running, a report may be generated by switching to its screen using ALT-ESC or other method NetWare™ provides for switching screens, and pressing a key. The report may be viewed by logging a workstation into the server and looking at the log file, or a user interface may be provided at the server for viewing the information dynamically.

The tracker is set up to take over network operating system calls, in a way that makes it safe to unload at any time without causing interference with either the operating system or other NLMs. If undesirable events have happened since the last generation of a log file, however, a pending message indication can be made to appear to prompt an option to generate another log before unloading. The prompt can, however, be ignored without ill effects.

Figure 2:
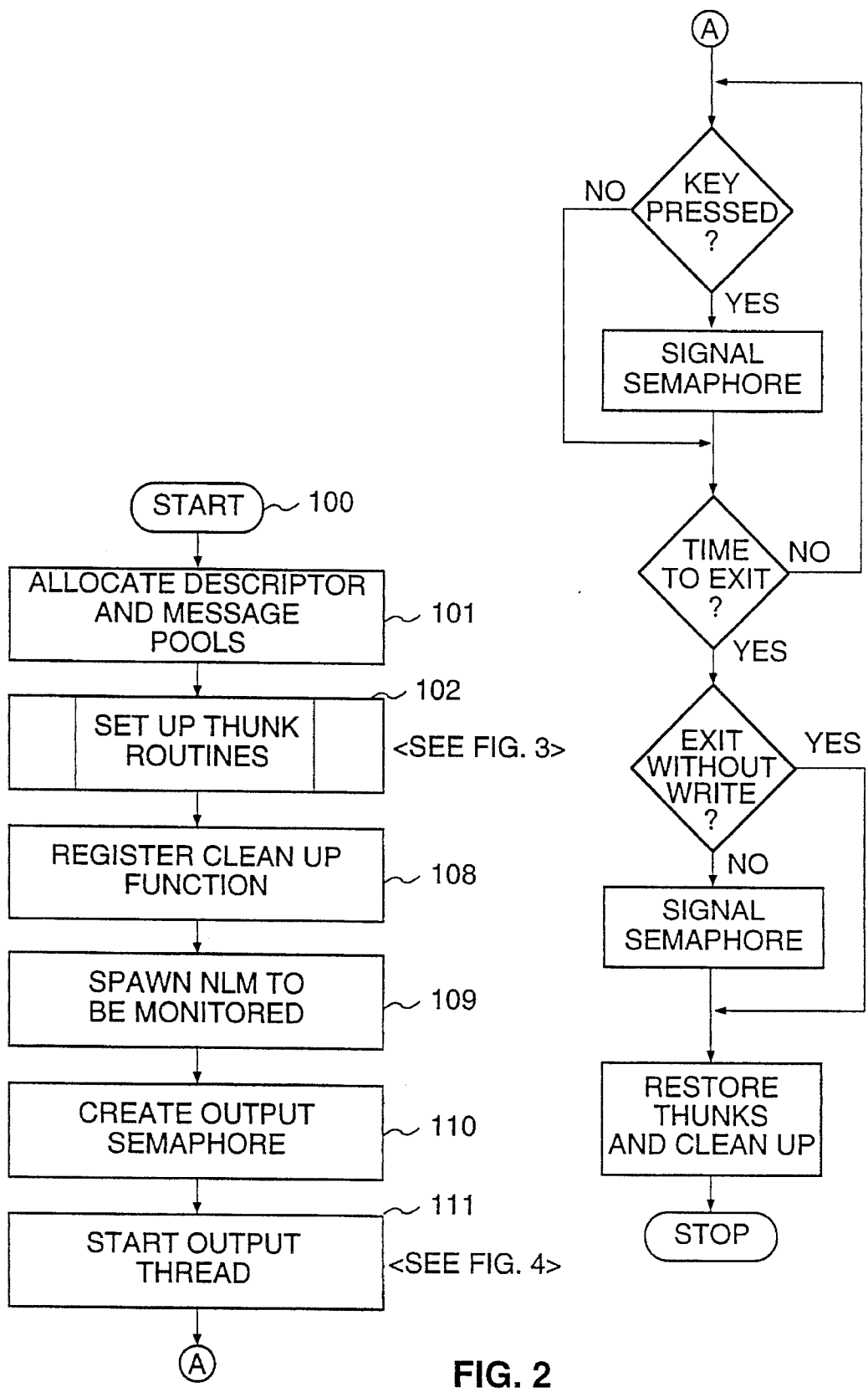
FIGS. 2-4 are flow diagrams of the steps of an NLM program usable in the method of FIG. 1.
Figure 3:
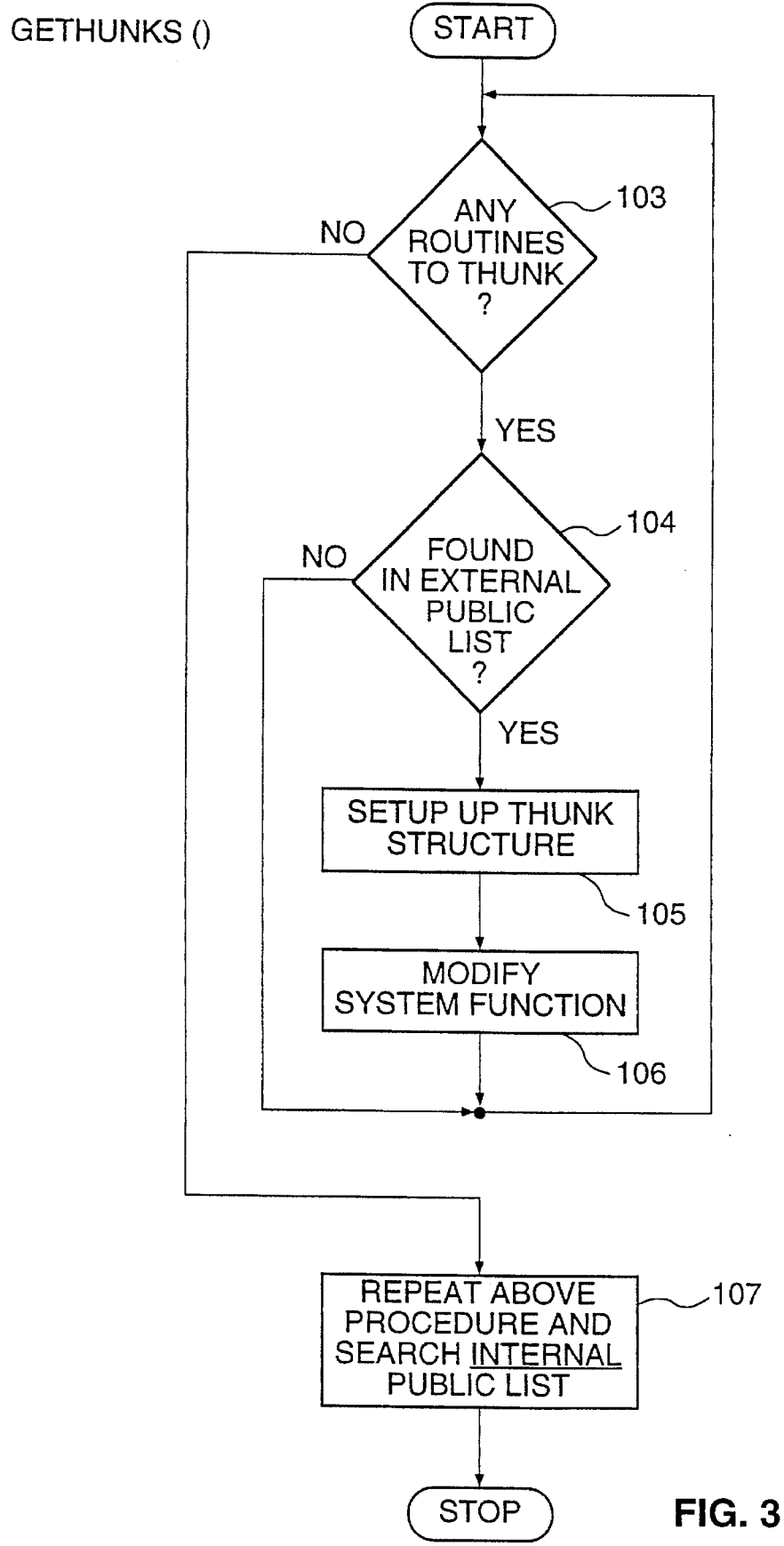
Figure 4:
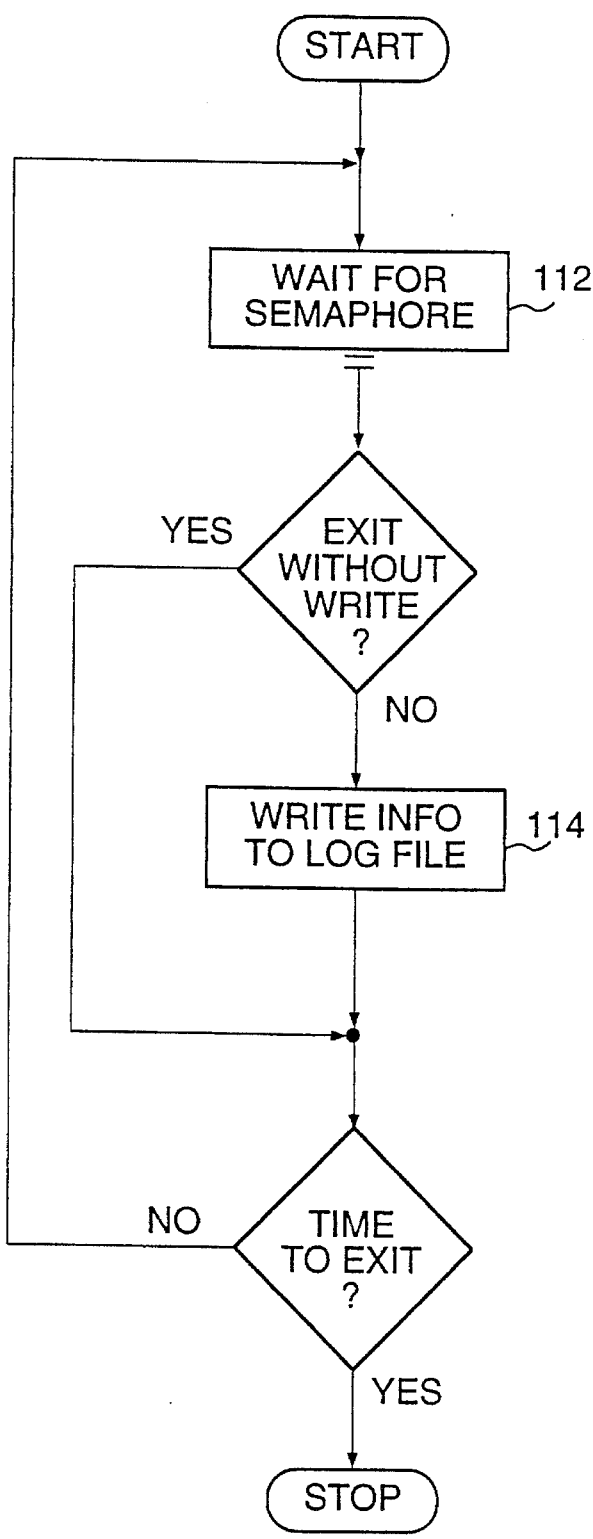

The flow diagram for main, thunk preparing and thread output writing routines of the exemplary tracker NLM are given in FIGS. 2–4.

As shown in FIG. 2, the tracker is started with the LOAD command at 100 and its command line argument parsed (broken down) to identify switch settings that enable the user to change the size of the ABLK and MSG pools and give the name of a specific NLM to load and monitor, if desired. A flag is set to prevent thunks from being called until the ABLK and MSG pools have been initialized. Allocations of blocks of memory for the ABLK allocation descriptor and MSG message memory block pools are made at 101, with insertions of allocated blocks made into the ABLK free list and MSG free list, respectively. Network operating system hook installation is then accomplished, setting up thunk routines at 102 so the tracker can take over all of the network operating system's memory allocation APIs, and redirect them to tracker routines. The steps for doing this are shown in FIG. 3. The tracker list of routines to be thunked (i.e. kernel and CLIB calls to be tracked) are considered one at a time at 103 (FIG. 3), and compared first against the external, and then the internal, public lists. The NetWare 386™ external public symbol list is scanned at 104 for the name of a particular allocation API, e.g. "malloc," that is to be taken over and its entry point address identified. (The interfaces to the symbol lists and their contents may be undocumented.) If it is found, the prefix or first instructions of code of the interface located at the identified entry point of the system routine are then examined at 105 to verify compatibility of prestored thunk prefix code equivalents with the routine prefix code to be replaced. Thunk prefix data is hard-coded data which replicates the machine code at the start of the original system routines to be "thunked." This data structure is used to verify that the code being overwritten by the thunking process is exactly what was expected. The entry point address and other information about the particular routine being thunked is then saved in a local address table. If compatibility is verified, the code of the system memory allocation routine is modified at 106 by replacing the first few instructions with instructions to cause an immediate jump to a corresponding routine of the tracker NLM (viz. near 32-bit jump to offset of thunk function), whenever that allocation API is called. (If the code is not exactly the same, e.g. because the system routine has been changed since that version of the tracker was released, the system routine will not be thunked.) The process is then repeated at 107 for the NetWare 386™ internal public list.

The data structures for the saved entry point information may include the name of the system function, which public symbol list (external or internal) it was in, a pointer to the symbol list entry address, a pointer to save for the old system pointer, a pointer to the old system owner, a pointer to the expected code, size of the code, and address of the thunk to which it was redirected. Thunk data structures may include the name of the system function to be thunked, a pointer to the original system function, a pointer to the tracker stub function, a pointer to the expected code prefix structure for that function, and a pointer to the tracker thunk function.

Routines are thereafter set up at 108 (FIG. 2) to be called when the tracker NLM is unloaded, to ensure the removal of all resources allocated to the tracker in the previous steps, i.e. ensure deallocation of allocated ABLK and MSG memory blocks and replacement of all jump instruction overwrites with the original replaced code for all modified system routines. If a user has requested that a particular other NLM be monitored (determined by parsing at step 100 above), the other NLM is then spawned (loaded into another location in memory and executed) at 109, so its operation can be monitored.

A local output semaphore is then created at 110 to control output to the log file,. The output thread is then started at 111, which waits at 112 (FIG. 4) for the local semaphore to be incremented, to write information to the log file at 114. The tracker program is looped until the user hits a keystroke with the server in the tracker NLM screen, or another NLM being monitored is unloaded. This initiates a reading of the ABLK and MSG lists to generate a report of the allocation history and error messages. The undocumented symbol lists are used to discover the point in the monitored NLM from which the allocation API was called. In this way, a location within the user's NLM can be specified in the generated report. For example, rather than indicating that the event happened at offset 0A56FE5Dh, the report may say that the event happened at "DisplayWindow+104." This makes the locations of the original events much easier to find in the original source.

As the system's memory allocation routines are interrupted, MSG and ABLK memory blocks are reassigned from their free lists to their used lists by virtue of the tracker routines which perform the following steps: 1) (In assembly language) saving caller registers and setting up caller's arguments on the stack; 2) (In assembly) simulating the first few instructions of the allocation API which were overwritten by the jump instructions; 3) (In assembly) calling the rest of the original allocation API in NetWare 386™ to service the initial request; 4) (In assembly) calling the corresponding tracker NLM reporting routine to report the original arguments and results returned from the allocation API; 5) Performing error checking on the parameters and returning values from the original caller and allocation APIs. Removing ALBK and MSG pool memory blocks from the free lists as needed, filling them out, and placing them on the used lists; and, finally, 6) (In assembly) restoring the state of the system and returning to the original caller, as if only the allocation API had been called, and nothing else had happened.

An ABLK block structure is created/freed for each corresponding allocation/free system call. This is done by adding an ABLK to or removing an ABLK from the list of outstanding allocations. All ABLKs are allocated at startup (step 101 in FIG. 2) and placed in the ABLK free pool. When an allocation is made in response to a monitored system call for memory, an empty block is taken from the ABLK free pool, filled out with the system call return data, and added to the ABLK outstanding allocation pool. When a subsequent call frees previously allocated memory, the ABLK outstanding allocation pool is searched for the ABLK entry associated with that block of memory, and the entry is removed, returning the empty ABLK block to the ABLK free pool. When the tracker exits, all ABLK memory blocks are returned to the server. Both the outstanding ABLK allocation list and the ABLK free pool are kept as simple linked lists. For speed in locating blocks to be released, the outstanding allocation list is advantageously kept in ascending block address order.

In a similar manner, a MSG block structure is created for each unusual event occurrence. All MSG blocks allocated at startup (step 101 in FIG. 2) are placed in the MSG block free pool. When a message event occurs, an empty MSG block is taken from the free pool, filled out with message data, and added to the MSG message queue pool (list of filled out blocks, kept in order of occurrence). When a message is written out, the corresponding block is removed from the message queue pool and returned to the MSG free pool. When the tracker exits, all MSG memory blocks are returned to the server. Both the MSG message queue and MSG free pool are maintained as linked lists. The tracker may be programmed to issue a warning prompt to the user, whenever the number of blocks left in the MSG free pool decreases below 10% of its initial allocation.

ABLK outstanding allocation pool data structure may include the identity of the function called, the size and address of the memory block allocated or freed, identification of the caller and the context within which the call was made. A message block structure may include function, an error code corresponding to the error occurring ("no memory," "internal no memory," "block never allocated," "duplicate block," "original block," "freed NULL," or "alloc'd zero bytes" the ), size and address of the block causing the error; identification of the caller; and the context within which the call was made.

The reporting stubs called by the thunks for the various functions should be kept short so as to minimize adverse impact on file server performance. The stubs do basic checks on the integrity of the operations and queue ABLKs and MSGs according to the result. The caller parameter is the address following the call of the allocation function. The log file generator is set up to decide who owns the address. If an NLM was spawned, all calls except those that were called from the context of the spawned NLM, will be ignored. NLM ownership of a particular call is determined by a routine that peeks at internal data structures and determines the identity of the caller.

The tracker can be designed to prompt the user when a spawned NLM is unloaded, or at the time the tracker itself is otherwise exited and messages remain in the MSG message queue. An exit flag can be set to indicate the need for a final write of the log file prior to exiting. The write semaphore can then be triggered to provide a final report. When the program is exited, the exit flag can be set to prevent the thunks from being called while resources are being returned to the server (i.e. while the original replaced code is being restored to the thunked functions). The printed log file prints the number of times each stub was called; the contents of all queued messages; and the descriptions of all outstanding blocks and information on who (i.e. which program) allocated them.

Those skilled in the art to which the invention relates will appreciate that various substitutions and modifications can be made to the described embodiments without departing from the spirit and scope of the invention as described by the claims below.

What is claimed is:

1. A method for tracking server memory allocations and deallocations that are attempted or invoked by system calls made from one or more server resident programs running in a computer network server, where the server is operating under control of a network operating system having system memory allocation functions callable by the one or more server resident programs for making desired memory allocations and deallocation, the method comprising the steps of:

(a) allocating memory blocks for storing tracking information wherein said step (a) of allocating memory blocks includes:

(a.1) allocating a first pool of memory blocks for storing normal return information; and (a.2) allocating a second pool of memory blocks for storing exception messages;

(b) identifying entry points for accessing the system memory allocation functions;

(c) replacing initial instructions of the system memory allocation functions that are accessed by the identified entry points with jump instructions so as to cause system calls made to those system functions to be redirected to respective tracker routines;

(d) in response to each system call whose execution is redirected to a respective tracker routine, executing instructions equivalent to the respectively replaced initial instructions of the called system memory allocation function, and then calling the remainder of the called system memory allocation function from the tracker routine to which the redirection jump was made;

(e) receiving return information from the called remainder of the system memory allocation function at the corresponding tracker routine;

(f) recording the received return information in the memory blocks allocated for storing tracking information, and (g) returning the received return information to the server resident program that made the system call.

2. A tracking method according to claim 1 wherein said step (f) of recording includes for each call made by a server resident program to a system memory allocation function:

(f.1) recording normal return information, if any, in a corresponding portion of the pre-allocated first pool of memory blocks; and (f.2) recording exception return information, if any, in a corresponding portion of the pre-allocated second pool of memory blocks.

3. A method for tracking server memory allocations and deallocations that are attempted or invoked by system calls made from one or more server resident programs running in a computer network server, where the server is operating under control of a network operating system having system memory allocation functions callable by the one or more server resident programs for making desired memory allocations and deallocations and wherein said network operating system has both externally and internally listed groups of public functions that are callable by a server resident program, the method comprising the steps of:

(a) allocating memory blocks for storing tracking information;

(b) identifying entry points for accessing the system memory allocation functions and wherein the step (b) of identifying entry points includes:

(b.1) searching the externally listed public functions for callable memory allocation functions;

(b.2) searching the internally listed public functions for callable memory allocation functions; and (b.3) identifying the entry points of found memory allocation functions in both the externally and internally listed groups of public functions;

(c) replacing initial instructions of the system memory allocation functions that are accessed by the identified entry points with jump instructions so as to cause system calls made to those system functions to be redirected to respective tracker routines;

(d) in response to each system call whose execution is redirected to a respective tracker routine, executing instructions equivalent to the respectively replaced initial instructions of the called system memory allocation function, and then calling the remainder of the called system memory allocation function from the tracker routine to which the redirection jump was made;

(e) receiving return information from the called remainder of the system memory allocation function at the corresponding tracker routine;

(f) recording the received return information in the memory blocks allocated for storing tracking information, and (g) returning the received return information to the server resident program that made the system call.

4. A tracking method according to claim 3 further comprising:

setting up a thunk structure for each callable memory allocation function identified by said step (b) of identifying entry points.

5. A tracking method according to claim 4 wherein each thunk structure includes an assembly code portion and a second portion executable at a higher language level.

6. A method for tracking server memory allocations and deallocations that are attempted or invoked by system calls made from one or more server resident programs running in a computer network server, where the server is operating under control of a network operating system having system memory allocation functions callable by the one or more server resident programs for making desired memory allocations and deallocations, the method comprising the steps of:

(a) allocating memory blocks for storing tracking information;

(b) identifying entry points for accessing the system memory allocation functions;

(c) replacing initial instructions of the system memory allocation functions that are accessed by the identified entry points with jump instructions so as to cause system calls made to those system functions to be redirected to respective tracker routines;

(d) in response to each system call whose execution is redirected to a respective tracker routine, executing instructions equivalent to the respectively replaced initial instructions of the called system memory allocation function, and then calling the remainder of the called system memory allocation function from the tracker routine to which the redirection jump was made;

(e) receiving return information from the called remainder of the system memory allocation function at the corresponding tracker routine;

(f) recording the received return information in the memory blocks allocated for storing tracking information and wherein said step (f) of recording is limited to memory allocations and deallocations that are attempted or invoked by system calls made from an identified one of plural server resident programs running in the computer network server; and (g) returning the received return information to the server resident program that made the system call.

7. A tracking method according to claim 6 further comprising the step of:

spawning the identified one of the plural server resident programs after performing said steps (a) through (c).

8. A method for tracking server memory allocations and deallocations that are attempted or invoked by system calls made from one or more server resident programs running in a computer network server, where the server is operating under control of a network operating system having system memory allocation functions callable by the one or more server resident programs for making desired memory allocations and deallocations, the method comprising the steps of:

(a) allocating memory blocks for storing tracking information;

(b) identifying entry points for accessing the system memory allocation functions;

(c) replacing initial instructions of the system memory allocation functions that are accessed by the identified entry points with jump instructions so as to cause system calls made to those system functions to be redirected to respective tracker routines;

(d) in response to each system call whose execution is redirected to a respective tracker routine, executing instructions equivalent to the respectively replaced initial instructions of the called system memory allocation function, and then calling the remainder of the called system memory allocation function from the tracker routine to which the redirection jump was made;

(e) receiving return information from the called remainder of the system memory allocation function at the corresponding tracker routine;

(f) recording the received return information in the memory blocks allocated for storing tracking information;

(g) returning the received return information to the server resident program that made the system call; and (h) using the return information recorded in the allocated memory blocks for identifying improper attempts or invocations of server memory allocations and deallocations by system calls made from one or more server resident programs being tracked wherein the one or more tracked server resident programs allocate system memory after being loaded but do not deallocate the allocated system memory prior to being unloaded.

9. A method for tracking server memory allocations and deallocations that are attempted or invoked by system calls made from one or more server resident programs running in a computer network server, where the server is operating under control of a network operating system having system memory allocation functions callable by the one or more server resident programs for making desired memory allocations and deallocations, the method comprising the steps of:

(a) allocating memory blocks for storing tracking information;

(b) identifying entry points for accessing the system memory allocation functions;

(c) replacing initial instructions of the system memory allocation functions that are accessed by the identified entry points with jump instructions so as to cause system calls made to those system functions to be redirected to respective tracker routines;

(d) in response to each system call whose execution is redirected to a respective tracker routine, executing instructions equivalent to the respectively replaced initial instructions of the called system memory allocation function, and then calling the remainder of the called system memory allocation function from the tracker routine to which the redirection jump was made;

(e) receiving return information from the called remainder of the system memory allocation function at the corresponding tracker routine;

(f) recording the received return information in the memory blocks allocated for storing tracking information;

(g) returning the received return information to the server resident program that made the system call; and (h) using the return information recorded in the allocated memory blocks for identifying improper attempts or invocations of server memory allocations and deallocations by system calls made from one or more server resident programs being tracked wherein the one or more tracked server resident programs attempt to deallocate system memory after being loaded but have not previously allocated system memory prior to attempting the deallocation.

10. A method for tracking server memory allocations and deallocations that are attempted or invoked by system calls made from one or more server resident programs running in a computer network server, where the server is operating under control of a network operating system having system memory allocation functions callable by the one or more server resident programs for making desired memory allocations and deallocations, the method comprising the steps of:

(a) allocating memory blocks for storing tracking information;

(b) identifying entry points for accessing the system memory allocation functions;

(c) replacing initial instructions of the system memory allocation functions that are accessed by the identified entry points with jump instructions so as to cause system calls made to those system functions to be redirected to respective tracker routines;

(d) in response to each system call whose execution is redirected to a respective tracker routine, executing instructions equivalent to the respectively replaced initial instructions of the called system memory allocation function, and then calling the remainder of the called system memory allocation function from the tracker routine to which the redirection jump was made;

(e) receiving return information from the called remainder of the system memory allocation function at the corresponding tracker routine;

(f) recording the received return information in the memory blocks allocated for storing tracking information;

(g) returning the received return information to the server resident program that made the system call; and (h) using the return information recorded in the allocated memory blocks for identifying improper attempts or invocations of server memory allocations and deallocations by system calls made from one or more server resident programs being tracked wherein the one or more tracked server resident programs attempt to deallocate system memory to a first free pool after having allocated the system memory from a different second free pool.

\* \* \* \* \*